(12) United States Patent
de Jong et al.

(10) Patent No.: US 12,031,378 B2
(45) Date of Patent: Jul. 9, 2024

(54) SYSTEM AND METHOD FOR CONTROLLING THE STATE OF TWO OR MORE LIQUID-CRYSTAL-BASED SWITCHABLE ELEMENTS

(71) Applicant: Merck Patent GmbH, Darmstadt (DE)

(72) Inventors: Ties de Jong, De Veldhoven (NL); Heiko Christ, Darmstadt (DE); Jasper van den Muijsenberg, De Veldhoven (NL); Jens Osterodt, Darmstadt (DE); Abraham Karel Riemens, Ag Eindhoven (NL)

(73) Assignee: Merck Patent GmbH (DE)

( * ) Notice: Subject to any disclaimer, the term of this patent is extended or adjusted under 35 U.S.C. 154(b) by 207 days.

(21) Appl. No.: 17/511,984

(22) Filed: Oct. 27, 2021

(65) Prior Publication Data

US 2022/0128846 A1 Apr. 28, 2022

(51) Int. Cl.
 *E06B 9/24* (2006.01)
 *G02F 1/163* (2006.01)
 *H04L 12/28* (2006.01)

(52) U.S. Cl.
 CPC ............... *E06B 9/24* (2013.01); *G02F 1/163* (2013.01); *H04L 12/2816* (2013.01); *E06B 2009/2464* (2013.01)

(58) Field of Classification Search
 None
 See application file for complete search history.

(56) References Cited

U.S. PATENT DOCUMENTS 10,598,970 B2   3/2020  Hainfellner
11,112,674 B2 *  9/2021  Jack ..................... G02F 1/163
(Continued)

FOREIGN PATENT DOCUMENTS

DE   102014220818 A1    4/2016
WO   2016010186 A1      1/2016
WO   WO-2016086017 A1 *  6/2016  ........... E06B 3/6722

OTHER PUBLICATIONS

International Search Report and Written Opinion for International Application No. PCT/EP2021/079441, dated Feb. 3, 2022, 12 pages.
(Continued)

*Primary Examiner* — Saptarshi Mazumder
(74) *Attorney, Agent, or Firm* — Buchanan Ingersoll & Rooney PC

(57) ABSTRACT

A method for controlling the state of two or more liquid crystal-based switchable elements is proposed, wherein the switchable elements are configured as smart windows and/or as switchable subunits of smart windows, wherein in a first step a), at least two keyframes are defined, wherein each keyframe comprises setting values defining the intended state of a group of switchable elements. In a subsequent step b), a display frame is computed, wherein the display frame comprises setting values for the state of the group of switchable elements based on at least one of the defined keyframes. In a subsequent step c), the state of each of the switchable elements of the group of switchable elements is set as defined by the setting values of the computed display frame. Also, a master controller for use with the method, and a system implementing the method.

15 Claims, 5 Drawing Sheets

(56) References Cited

U.S. PATENT DOCUMENTS

| | | | |
|---|---|---|---|
| 2014/0171191 A1* | 6/2014 | Cox | A63F 13/497 |
| | | | 463/31 |
| 2017/0075183 A1 | 3/2017 | Brown | |
| 2018/0188586 A1* | 7/2018 | Chen | G02F 1/13718 |
| 2019/0361312 A1 | 11/2019 | Podbelski et al. | |
| 2021/0112512 A1* | 4/2021 | Dickie | G06F 1/12 |

OTHER PUBLICATIONS

Baetens et al., "Properties, requirements and possibilities of smart windows for dynamic daylight and solar energy control in buildings: A state-of-the-art review ", Solar Energy Materials & Solar Cells, 2010, 94, pp. 87-105.

* cited by examiner

SYSTEM AND METHOD FOR CONTROLLING THE STATE OF TWO OR MORE LIQUID-CRYSTAL-BASED SWITCHABLE ELEMENTS

CROSS-REFERENCE TO RELATED APPLICATIONS

This application is a U.S. non-provisional application filed under 35 U.S.C. § 111(a), claiming priority under 35 U.S.C. § 119(a) of European Application No. EP20204274.3, filed Oct. 28, 2020, which is incorporated herein by reference in its entirety and for all purposes.

BACKGROUND

The invention relates to a method for controlling the state of two or more liquid crystal-based switchable elements, the switchable elements being configured as smart windows and/or switchable subunits of smart windows.

Further aspects relate to a master controller for use with the method and a system implementing the method.

Smart windows, which may be liquid crystal-based, allow the control of transmission of light through the window by means of a driving signal which controls the state of the smart window. Such smart windows are known in the art.

The review article by R. Baetens et al. "Properties, requirements and possibilities of smart windows for dynamic daylight and solar energy control in buildings: A state-of-the-art review", Solar Energy Materials & Solar Cells 94 (2010) pages 87-105 describes tintable smart windows. Smart windows can make use of several technologies for modulating the transmittance of light such as devices based on electrochromism, liquid crystal devices and electrophoretic or suspended-particle devices. Liquid crystal-based devices employ a change in the orientation of liquid crystal molecules between two conductive electrodes by applying an electric field which results in a change of their transmittance.

Liquid crystal-based devices usually comprise in this order a first substrate, a switchable layer and a second substrate. The switchable layer comprises at least one liquid crystalline material. The two substrates are coated with a transparent electrode to allow control of the switchable layer by means of an electric field.

In smart windows, the device for modulating the transmittance of light, in the following referred to as switchable optical device, is usually laminated to a further sheet or carrier glass sheet or between two further substrates or carrier glass substrates for protection of the switchable optical device and for mechanical rigidity. In this lamination process, a glass sheet is bonded to a substrate of the switchable optical device by means of a thermoplastic interlayer. In the lamination process, the interlayer is arranged between the carrier glass sheet(s) and the at least one switchable optical device. In a subsequent treatment, which usually involves application of heat and/or elevated pressure or reduced pressure, the at least one sheet, the interlayer and the switchable optical device are bonded.

A smart window may comprise additional panes which form an insulated glazing unit. Further, the smart windows may comprise additional components such as frame for mechanically mounting of the switchable optical device and/or of further panes.

The state of the smart window or more specifically of the at least one switchable optical device of the smart window is controlled by providing a driving signal applied to the electrodes of the switchable element. A change of the driving signal results in a change of the state of the switchable optical device.

Smart windows may be arranged in patterns, for example in a façade of a building, or a single smart window may include a plurality of independently switchable subunits arranged in a pattern. Setting the state of each smart window and/or each subunit in such an arrangement of multiple smart windows and/or multiple switchable subunits may be cumbersome. It is thus desirable to provide a user with systems and methods for assisting the user in setting the desired states of each smart window and/or each switchable subunit in an arrangement comprising a plurality of smart windows and/or switchable subunits.

A smart window which may be used as an electronic curtain is known from WO2016010186A1. The smart window includes a switchable polymer-dispersed liquid crystal layer and a light transmission state of this switchable layer may be controlled by means of an electric field applied using electrodes. The smart window has divided electrodes for controlling a state of the window which are divided in a stripe or lattice pattern. Controllers are used to provide voltage to the divided electrodes in response to a signal received form a portable communication device. The portable communication device may include a touch screen for defining a transmissive area of the polymer-dispersed liquid crystal panel.

DE102014220818 discloses a system and a method for reducing glare from sunlight in a room. The system comprises a tintable panel arranged in a glazing, the tintable panel comprising a plurality of cells which may be tinted independently from each other. The system further comprises an optical sensor which acquires an image of the room and occupants present in the room and controls tint of the individual cells based on the acquired image such that a shadow is cast onto the occupants. The system implements an interactive process wherein a change in the cast shadow is assigned to the respective cells of the panel. A sync signal may be applied to the panel in order to sync the components of the system, in particular the optical sensor and the panel, wherein time delays of the signal transmission and in the individual components are taken into account.

SUMMARY OF THE INVENTION

The known systems and methods in the art cannot aid a user in the task of defining and activating complex patterns of installations comprising a plurality of switchable windows and/or a plurality of switchable subunits.

A method for controlling the state of two or more liquid crystal-based switchable elements is proposed, wherein the switchable elements are configured as smart windows and/or as switchable subunits of smart windows.

The method comprises a first step a) in which at least two keyframes are defined, wherein each keyframe comprises setting values defining the intended state of a group of switchable elements. The group may either be a selection of one or more specific switchable elements or all available switchable elements.

In a subsequent step b), a display frame is computed, wherein the display frame comprises setting values for the state of the group of switchable elements based on at least one of the defined keyframes.

After computing of the display frame, the state of each of the switchable elements of the group of switchable elements is set as defined by the setting values of the computed display frame in a subsequent step c) of the method.

The switchable elements comprise liquid crystal-based switchable optical devices capable of controlling the transmittance of light. Such a liquid crystal-based switchable optical device usually comprises in this order a first substrate, a switchable layer and a second substrate. The switchable layer comprises at least one liquid crystalline medium. The two substrates are each coated with a transparent electrode to allow control of the switchable layer by means of an electric field. The liquid crystalline medium may comprise further components such as spacers in order to ensure a uniform thickness of the liquid crystal based switchable layer.

The switchable layer of a liquid crystal based switchable optical device comprises a liquid-crystalline medium. A liquid-crystalline medium is defined as a substance having the properties of a liquid crystal. Typical liquid-crystalline media comprise at least one composition having elongated rod-shaped molecules. The liquid-crystalline media used in conjunction with the present invention have at least two states and may have intermediate states. The state of the liquid-crystalline medium is controlled using an electric field which is generated by an AC driving voltage applied between the two transparent electrodes. For providing driving signals to the two transparent electrodes, the switchable elements may be connected to a controller.

Preferably, the switchable optical devices are liquid crystal (LC) based devices selected from modes based on either LC-dye mixtures/LC without dyes and modes described by geometry of twisted nematic, super twisted nematic, planar or vertical ECB nematic, Heilmeier, vertically aligned, twisted vertical aligned, highly twisted nematic, polymer stabilized cholesteric texture (PSCT), polymer networked liquid crystal (PNLC) or polymer dispersed liquid crystal (PDLC). The switchable optical devices may include further functional layers such as, for example, color filters, alignment layers and/or polarizers. Optionally, two or more of such switchable optical devices may be stacked in the switchable element.

Preferably, the liquid crystal based switchable optical device additionally comprises an alignment film located on the first substrate layer and/or the second substrate layer. The alignment film is preferably arranged on the side facing the switchable layer. If an electrode is also located on the respective substrate layer, the alignment film is preferably arranged on the conductive electrode layer so that the alignment film is in direct contact with the switchable layer. The alignment film may be rubbed in an alignment direction.

The two substrate layers and the liquid-crystalline medium are arranged as a cell wherein the liquid-crystalline medium is placed in the gap formed by the two electrode layers. The size of the gap is preferably from 1 μm to 300 μm, preferably from 3 μm to 100 μm and more preferably from 5 μm to 100 μm, and most preferably from 10 μm to 50 μm. The cell is usually sealed by means of glue lines located at or near the edges.

The optical state of the switchable optical devices and thus of the switchable elements may be controlled by the application of an electrical driving signal in the form of an AC voltage to the electrodes. Typical switching times between two states may, for example range from about 0.1 seconds to 5 seconds, preferably from 0.2 to 2 seconds, more preferably from 0.5 to 1 seconds. For example, full range switching from a dimmed state to a transparent state of a typical liquid crystal based switchable element takes approximately 0.5 seconds and full range switching from a transparent to a dimmed state takes approximately 0.8 seconds. The full switching range is typically defined as a step between 10% and 90% of the maximum range. That is, because the last 10% (on either side) often is reached in an asymptotic manner, while this is visually less important.

Preferably, a setting value defines the desired optical state of a switchable element in form of number selected from a minimum value, corresponding to the minimum level of the state, and a maximum value, corresponding to the maximum level of the state. A setting value may be provided in form of a fixed point, floating point or integer value. For example a setting value may be provided in form of an integer number from 0 to 255. A keyframe as defined in step a) as well as a display frame computed in step b) comprises the setting values for defining the optical states of each switchable element of a group.

Preferably, setting the state according to step c) comprises for each of the switchable elements of the group of switchable elements a step d) of deriving of a driving signal for the respective switchable element based on the respective setting value defined by the display frame and configuration values defining the relation between driving signal and a setting value of the respective switchable element, and a step e) of applying the derived driving signal to the respective switchable element.

The driving signal may, for example, be a DC driving signal or an AC driving signal having a defined driving voltage or a defined driving current. For example, the state of a switchable element, in particular a liquid crystal based switchable element, is defined by setting an appropriate driving voltage. For example, the driving voltage of the driving signal may be defined via a relation between the driving voltage and a setting value of the respective switchable element.

A driver configured to generate a driving signal, in particular an AC driving signal, in accordance with the derived voltage may be used for applying the computed driving voltage to the respective switchable element. The driver may receive parameters for setting the driving signal, in particular the setting value or derived voltage of the driving signal, from a connected controller. Alternatively, a controller and one or more drivers may be configured as a single device. A single driver may be configured to provide driving signals to one or more switchable elements. Preferably, a driver is configured to provide driving signals to more than one switchable element, for example for 2 to 12 switchable elements, in particular 8 switchable elements.

Preferably, the setting value is provided as a digital signal to the driver. The configuration values may be used for translating the digital signal into the driving signal.

Preferably, configuration data including the configuration values is assigned to each of the switchable elements. The configuration values may be set individually for each of the switchable elements or may be set identically for groups of switchable elements having the same or similar properties.

Preferably, configuration data assigned to a switchable element comprises address information for identifying a driver for driving the respective switchable element and the address information is used to transmit the setting value or the derived driving signal to the identified driver. The address information may further comprise information for identifying a controller to which the specific driver is connected in order to identify a complete communication path for communicating with the driver. Further, the address information may additionally comprise information for identifying a specific channel if a driver comprises more than one channel for generating driving signals and thus is connected to multiple switchable elements.

The use of address information allows for large setups in which multiple controllers and/or drivers are required to supply the driving signals to each of the switchable elements. The controllers may be configured identically or may be configured in form of a hierarchical network. The controllers may be directly connected to each other or may be connected to a communication network for communication and in particular for receiving the setting values or parameters such as a driving voltage. In such an arrangement, the address information preferably comprises an indication of the controller to which a driver for driving a specific one of the switchable elements is connected. In case a hierarchical network of controllers is used, the address information may include indications of all controllers forming a communication pathway in order to communicate with the driver to which a specific one of the switchable elements is connected.

Preferably, a communication network is arranged between a master controller which is at least configured to compute the display frame according to step b) and a driver for driving a switchable element, wherein the communication network comprises at least one sub-controller. Preferably, the master controller and the at least one sub-controller have assigned indications which may be used as part of address information for relaying information to a driver to which a specific one of the switchable elements is connected.

In such an arrangement, the controllers are in a hierarchical configuration, wherein the master controller is preferably configured to store the keyframes defined in accordance with step a) and to compute the display frame according to step b) which comprises setting values for the individual switchable elements. Further, the master controller is configured to identify the sub-controller, to which a respective switchable element is connected, based on the address information and to route the respective setting value of the computed display frame to said sub-controller.

In an example for such a hierarchical configuration, the system spans over all windows of a façade of a building, covering multiple floors of the building. For each of the floors, the drivers for generating the driving signals may be located in close proximity to the switchable elements and one or more sub-controllers for relaying information to the drivers may be located closely to the drivers in an electronics cabinet on the respective floor. The sub-controllers are then connected to a master controller which may be located in one of the electronic cabinets.

Such a hierarchical configuration allows for setups having large numbers of switchable elements, for example up to 1000 or more preferably up to 5000 switchable elements. Accordingly, the method may be used to consistently control the state of all smart windows of an entire building.

A sub-controller and one or more drivers may be integrated into a single device. Such an integrated device is preferably configured to communicate directly with the master controller. Further, it is conceivable to allow further external driver devices to be connected to such an integrated sub-controller/driver device. The external driver device may also be provided as integrated sub-controller/driver devices having the sub-controller function disabled.

Further, it is possible to provide an integrated controller device implementing the functions of the master controller and one of the sub-controllers in a single integrated device. Such an integrated master controller/sub-controller device may allow connection of one or more external sub-controllers to expand the setup. The external sub-controller device may be provided as integrated master controller/sub-controller devices having the master controller function disabled. Still further, the external sub-controller device may be provided as an integrated sub-controller/driver device.

Preferably, the sub-controller is configured for storing current setting values of switchable elements assigned to the at least one sub-controller. In such a configuration, the sub-controller preferably comprises a storage memory for storing the current setting values. A current setting value represent the current state of the respective switchable element. The sub-controller is preferably configured to receive updates for the stored setting values from the master controller. Further, the sub-controller is preferably configured to control one or more drivers for generating driving signals for the connected switchable elements based on the stored setting values.

Preferably, the at least one sub-controller is further configured to store pending updates of the setting values of the switchable elements assigned to the at least one sub-controller and to update the current setting values in a coordinated manner in response to a trigger signal or trigger command received from the master controller.

In such a configuration, the sub-controller preferably comprises two storages for setting values, one for the current setting values and one for the pending updates. Upon receipt of the trigger signal or trigger command, the stored updates are applied to replace the previous current setting values and the new values are then distributed to the connected drivers. Alternatively, the sub-controller may comprise a single storage for setting values and a flag indicating pending updates for each of the setting values. Upon receipt of the trigger signal or trigger command, the new setting values having a set flag are distributed to the connected drivers and the flag is cleared.

The storage for the pending updates allows a master controller to first distribute updates for the setting values to all sub-controllers one after another and, after each of the sub-controllers has received all pending updates to the setting values, to apply the setting values in a coordinated manner by transmitting the trigger signal or trigger command. This has the advantage that new setting values according to a new display frame computed in accordance with step b) become effective essentially at the same time for each of the switchable elements, regardless of the speed of connection between the respective sub-controller and the master controller and the total number of switchable elements and/or sub-controllers. This is particular important in large setups in which a large number of sub-controllers is used and the process of sending new setting values to the sub-controllers is typically a time-sequential process in which every transmission takes a certain amount of time. Sending of the trigger command is only a single command for each of the sub-controllers which may be transmitted in only a fraction of the amount of time required for transmitting the commands for updating the setting values. This allows for a uniform appearance of the switchable elements as they change their state in a coordinated manner when a new display frame is computed and the respective setting values are applied to the switchable elements.

Preferably, a clock of the at least one sub-controller and a clock of the master controller are synchronized and the update of the current setting values is executed by the at least one sub-controller at a predetermined time after being triggered by the master controller. This allows for a coordinated application of new setting values to each of the switchable elements even if a trigger signal may not be received simultaneously by all of the sub-controllers.

Preferably, the at least one sub-controller is configured to communicate with the master controller using a first protocol and is configured to communicate with the at least one driver using a second protocol.

The first communication protocol is preferably selected to allow for large distances between the master controller and the sub-controllers. This facilitates the setup of large hierarchical networks in which, for example, the sub-controllers are distributed over several floors of a building and a single master-controller is connected to each of the sub-controllers. Also, the first communication protocol preferably has a higher bandwidth than the second communication protocol.

The first communication protocol may, for example, be selected from, a local area network (LAN) protocol, such as Ethernet or WiFi, LON, CANopen, Ethernet/IP, Powerlink, DeviceNet, Profinet, and EtherCat.

The second communication protocol is preferably used to span shorter distances than the first communication protocol such as the distance between two devices in the same electronics cabinet. In case of a hierarchical setup, the second communication protocol is used at a lower level in the hierarchy so that less bandwidth is required than for the first communication protocol allowing for the use of more cost-effective communication protocols.

The second communication protocol may, for example, be selected from RS485, RS232 or a device or circuit internal communication protocol such as I2C.

In case a sub-controller and one or more drivers are configured as a single integrated device, it is preferred that the integrated device is configured to use the first communication protocol for communication with the master controller. Additionally, the integrated device may make use of the second communication protocol for internal device communication between units implementing the function of the sub-controller and units implementing the function of one or more drivers. Still further, it is possible to expose an interface to the second communication protocol allowing connection of further external driver devices to such an integrated sub-controller/driver device.

Preferably, computing of a display frame in accordance with step b) is performed by selection of one of the defined keyframes as a setpoint in response to user input, sensor input and/or in dependence on predefined rules.

User input may be provided, for example, by means of buttons, switches or other input means. These input means for providing user input may be connected to a controller, in particular a master controller, which is configured to compute a display frame in accordance with step b) of the method. Alternatively, the input means may be connected to a further element, such as building management system, which in turn may communicate with the controller.

The input means may be connected using a communication bus, such as the KNX bus, BACnet, Dali, Modbus, eBus, Profibus, or by any other wireless or wired communication means.

User input means may, for example, be selected from the group comprising buttons, switches, such as on/off switches or dimmer switches, and smart devices such as smart phones and tablet computers. Such user input means may be used to allow a user to manually input preferred conditions which are considered when computing a display frame.

Sensor input may, for example, be provided directly via a connected sensor or indirectly via a rule which depends on certain sensor input. The sensor is preferably configured for detecting light, temperature or presence. For example, a light sensor may be configured as an interior or exterior photo sensor. A temperature sensor may, for example, be configured as an interior or exterior thermometer. A presence sensor may, for example, be configured as a motion detector, radar sensor, IR-sensor or noise sensor. Further suitable sensors may include sensors such as power consumption sensors or bird detection devices.

Interior and/or exterior photo sensors may be used to react to the actual lighting situation of a room and accordingly to provide respective signals which may be considered when computing a display frame for smart windows assigned to this room. Similarly, interior and/or exterior temperature sensors may be used when computing a display frame for the smart windows such that a desired temperature in a room is maintained. For example, if the temperature in the room is below the desired temperature, smart windows assigned to this room may be set to a bright state in order to allow more light and thus more heat to enter the room and if the temperature in the room is above the desired temperature, the smart windows may be set to a dark tinted state in order to block light and heat from entering the room.

Noise sensors may be used to react to sound and/or noise detected in a room. For example, smart windows assigned to a room may be switched depending on the detected low-pitched beat of sound recorded using the noise sensor to provide a disco light-like effect.

Room occupation sensors such as a radar sensor, IR-sensor or a motion detector may be used to react to the presence of people inside a room. Also, a noise sensor may detect noises caused by entering or leaving of a room.

Power consumption sensors may be used to detect the current power consumption of the building. For example, certain functions such as providing a uniform appearance of a façade of the building may be suspended in case the power consumption of the building exceeds a preset limit value. Limiting the peak power consumption of a building may be useful in order to receive lower pricing from a utility supplying electric power.

Information on historical climate data may, for example, be used to provide information on the expected heat input due to solar radiation for a certain day and to control the transmission of the smart windows accordingly.

In an embodiment shadows and shadow patterns during the course of the day and in particular in the course of the year including seasonal variations are taken into account. A shadow cast on a window at any given time inherently reduces the light and heat input. It may therefore be useful to adjust the transmittance setting of a window when it is in a shadow or partial shadow. In this respect, the position and relative motion of the sun, the position and direction of individual windows and façades, the time of day and the day of the year, the geographical location of the building or facility and the shape and position of surrounding buildings and other structures in the environment such as trees may be considered to generate shadow data, in particular shadow data covering the whole calendar year. Intervals of shadow values for individual windows may be suitably chosen, e.g. down to a few minutes or even seconds, preferably having shorter intervals especially during transition periods between full light exposure and full shadow. Depending on the data of the yearly shadow patterns the transmittance of the windows may be adapted accordingly, in particular by suitably limiting the switchable tinting or dimming range, e.g. by adding an offset and clipping the output range or applying a scaling factor to the output range and adding an offset value.

A sensor may be connected directly to a controller which is configured for computing a display frame according to step b). Alternatively, a sensor may, for example, be connected to a control unit such as a building management system which in turn communicates with a controller configured for computing a display frame. The sensor may be connected using a communication bus, such as the KNX bus, or by any other wireless or wired communication means.

Suitable other input means include in particular user devices such as a computer or smart devices such as smartphones, smartwatches and tablets. By means of an appropriate software application ("app"), a smart device may be configured to connect to the master controller. By means of the app, virtual input means such as a virtual dimming button may be provided to provide user input to the master controller. Also, other user interface means may be used such as sliders. The computer or smart device may communicate directly with the master controller by means of, for example, a local network connection such as Ethernet or Wi-Fi. Alternatively, the computer or smart device may communicate with the master controller via an internet connection. In such a configuration, the master controller is also provided with a connection to the internet and both the master controller as well as the user device are connected to a server or cloud service for relaying of commands.

The computation of a display frame may depend on rules which may be processed by a controller or by another element such as a building management system. Further, the rules may be processed by a cloud service providing computing resources and being connected to the controller. The rules may depend on data sources such as sensors, user input means and/or further data sources such as, for example, clocks, calendars, connections to communication devices and historical climate databases. Optionally data on shadow patterns may also be included.

Preferably, the state of a switchable element defines a tint and/or a haze level of the respective switchable element.

For example, a switchable element of a first (tint) type may, for example, control the tint or the transmission of light through a smart window and a switchable element of a second (scattering) type may, for example, control the haze of the smart window. A smart window may comprise a single switchable element or any combination of two or more switchable elements of the tint and scattering type. In particular, a smart window may comprise a stack of both a switchable element of the tint type and of the scattering type, so that transmission as well as haze may be controlled.

Preferably, at least two keyframes are assigned to an animation. Such an animation may describe a transition of one or more switchable elements from one state to another state, wherein further keyframes may define intermediate states of said transition. One or more animations may be defined, each of the animations having two or more keyframes.

Preferably, the animation is configured as an animation of a horizontally or vertically closing curtain.

The fast switching times of liquid crystal-based switchable elements is advantageously exploited to provide smooth transitions between states and aesthetically pleasing animations.

For example, a smart window of a room may comprise a plurality of switchable elements being arranged as an array having multiple rows and being configured for controlling tint. A first keyframe may define the state of all the switchable elements of this smart window as a state of maximum transparency and a final keyframe may define the state of all the switchable elements of this smart window as a state of minimum transparency. Intermediate frames may then consecutively define states in which the rows of the smart window become more and more opaque, beginning with the topmost row creating the effect of a curtain moving downwards.

In another example, a smart window of a room may comprise a plurality of switchable elements being arranged as an array having multiple columns and being configured for controlling tint. A first keyframe may define the state of all the switchable elements of this smart window as a state of maximum transparency and a final keyframe may define the state of all the switchable elements of this smart window as a state of minimum transparency. Intermediate frames may then consecutively define states in which the columns of the smart window become more and more opaque, beginning with a first column on one side creating the effect of a curtain moving sideways.

Any pattern may be defined as animation. For example, an animation may be used to display moving patterns using an array of switchable elements. In particular, an animation may be defined such that a building's façade is used to display moving text or images, wherein each of the smart windows of the façade is used as a pixel. This is particular useful if the smart windows are arranged in a grid-like arrangement.

Preferably, each keyframe is assigned a time code. This time code may be given in respect of an arbitrary unit, or as a standard unit such as seconds and may be used to define the speed of performing a transition between states of the switchable elements.

Preferably, an animation defined by the assigned keyframes is played back in accordance with the assigned time codes from a current time to a specific point in time by computing a display frame by means of a filter function in dependence on at least one of the keyframes of the animation and the current time, wherein steps of computing a display frame according to step b) and setting the states of the switchable elements according to step c) of the method are repeated until playback of the animation is complete and the current time is advanced in accordance with a predefined playback frame rate after each execution of step b).

The playback framerate defines the number of display frames which are computed per second. The framerate is preferably chosen in the range of from 0.5 to 15 frames per second, more preferably in the range of from 1 to 10 frames per second and is for example 5 frames per second.

The filter function may, for example be a nearest neighbor filter which is, for a given current playback time, configured to select the keyframe of the animation with the timecode closest to the current playback time.

Alternatively, the filter function may be a linear, polynomial or non-linear interpolation function depending on two or more keyframes of the animation. For example, the filter function may be a linear interpolation wherein a setting value of the display frame is computed based on a first setting value defined by a first keyframe, a second setting value defined by a second keyframe, and a weighing factor depending on the timecodes of the first and second keyframe and the current playback time.

Preferably, the specific point in time of the animation is selected as a setpoint in response to user input, sensor input or a predetermined rule and the animation is played back from the current time to the setpoint. Further, it is possible to define more than one animation so that a specific animation and a specific point in time of the selected animation may be defined as setpoint.

The animation defines a transition of the switchable elements from one state to another, wherein the specific point in time of the animation defines a certain intermediate state within the animation. Accordingly, the setpoint which is set by a user and/or is set in dependence of sensor input and/or a rule may be seen as defining a desired state of the respective switchable elements. After setting of the setpoint, the method modifies the states of the respective switchable elements by playing the animation from a current time to the specific point in time defined by the setpoint. The playback ends after the setpoint has been reached. The switchable elements are then in the state as defined by the animation for the point in time corresponding to the setpoint.

Preferably, a step size is assigned to the animation, wherein the step size is given in respect to the time codes assigned to the keyframes assigned to said animation, and the specific point in time of the animation is set as setpoint by receiving step up or step down commands as user input, sensor input and/or in response to predefined rules.

Assigning a certain step size to an animation allows defining of a setpoint by issuing step up or step down commands. For example, a step up command could be used to increase transmission of switchable elements and a step down command could be used to decrease transmission of switchable elements in steps of, for example, 10% in an animation wherein a first keyframe of the animation defines setting values for maximum transparency and a last keyframe of the animation defines setting values for a minimum transparency and the stepsize is for example chosen to be $\frac{1}{10}$ of the duration of the animation. The step up and step down commands may, for example, be issued using up/down buttons which may be operated by a user.

Preferably, computing of the display frame according to step b) further comprises adaptation of setting values defined by a keyframe by applying a function in response to user input, sensor input or a predetermined rule. The function may, for example, be application of a gain value by multiplication and/or application of an offset value by addition.

The adaptation may, for example, be used to adjust an animation which ranges from 0% transparency to 100% transparency to a range of from 20% to 80% if it is not intended to use the full dynamic range of the switchable elements. By means of such a scaling value it is not required to redefine the keyframes of the animation. Instead, only the scaling values require adjustment.

The adaptation may, for example, be defined by means of a gain value and an offset value. For example, if setting values are represented by means of integer values in the range of from 0 to 255, a gain value of 1 and offset of 0 will allow the use of the full range of setting values. A gain of 0.5 and an offset of 100 would limit the range to values of from 100 to 228.

The adaptation may be used in dependence on user/sensor input signals and/or rules. For example, a rule could be defined allowing the full range of values from 0 to 255 in cloudy conditions, but only a limited range of from 0 to 150 in bright conditions. In this example, a higher setting value results in a higher transparency, so this assures that there is always a certain level of sunlight dimming.

The proposed method allows automatic adaption of individual setting values for each of the involved switchable elements to changing conditions in dependence on, for example user interactions such as pressing a button, or input from rules or sensors. By using animations comprising at least two keyframes, the individual settings may be complex, such as an animation of a closing curtain. Such an animation has to be defined only once.

Subsequent changes in the desired state of the smart windows comprising the switchable elements may then easily be made by choosing the appropriate point in time of an animation as setpoint. For example, dependent on sensor input, setting values may be limited to 0.5 times the range, while user input such as step up/step down commands would still cause the animation to run to the desired setpoint in the animation. Further, the method allows defining of step sizes for the animation so that the point in time of an animation may easily be set by providing step up and step down commands. This way, automatic adaptation to changing lighting conditions may be easily achieved, while user preferences are still adhered to.

Further the system may be configured to react to specific input in predefined ways. For example, the system may be connected to a fire detection system, or a burglar detection system. Via such a connection, an alarm situation may be triggered. Depending on configuration rules, this may override currently running animations for a designated alarm animation. In response to such alarm animation, privacy windows, in which the setting value defines a haze level, may switch to their transparent state so firefighters can see into rooms. In order to create awareness to evacuate the building, solar windows, in which the setting value defines a tint level, the windows may show a dark/light checkerboard pattern, that animates by swapping the dark and light windows back and forth.

Advantageously, the proposed method allows for a smooth transition between a current state and a desired state defined by the setpoint by playback of the animation with high frame rates of typically 5 frames per second or higher. Further, the method allows the use of interpolation between two or more keyframes for smooth transitions. Accordingly, the method allows the creation of aesthetically pleasing transition effects from one state of one or more switchable elements to another state. Such dynamic effect may be used to draw attention of a user and to convey information.

Further, the method provides synchronization between multiple controllers so that a transition between states is consistent between all involved switchable elements.

A further aspect of the invention relates to a master controller for controlling the state of two or more liquid crystal-based switchable elements. The master controller is configured for use in one of the methods described herein. In particular, the master controller is configured to store keyframes defined in accordance with step a) of the method and to compute a display frame in accordance with step b) of the method.

Further, it is an object of the invention to provide a system for controlling the state of two or more liquid crystal-based switchable elements for use in one of the methods described herein. The system comprises a master controller and at least one driver for driving at least one switchable element.

Preferably, the system comprises communication network arranged between the master controller and the at least one driver. Preferably, the communication network comprises at least one sub-controller which is configured for storing current setting values of switchable elements assigned to the at least one sub-controller.

The master controller and/or the system may be configured to provide connections for setting up the configuration of the system, in particular the configuration of the master controller. For example, the system may provide a network connection to allow configuration of the master controller. This may be a local network connection or a connection to the internet. In case a local network connection is provided, a computer running configuration software may be connected, for example, to perform the initial setup of the master controller. In case a connection to the internet is provided, the master controller and/or the system may be configured for connecting to a remote configuration service to configure the master controller. In particular, the connection may allow the initial setup of the master controller which comprises the definition of the animations and their keyframes. Such a remote configuration service may be cloud-based.

Further, the master controller and/or the system may be configured to provide a diagnosis connection for communicating status messages and/or error messages.

BRIEF DESCRIPTION OF THE DRAWING FIGURES

DETAILED DESCRIPTION OF THE INVENTION

Figure 1:
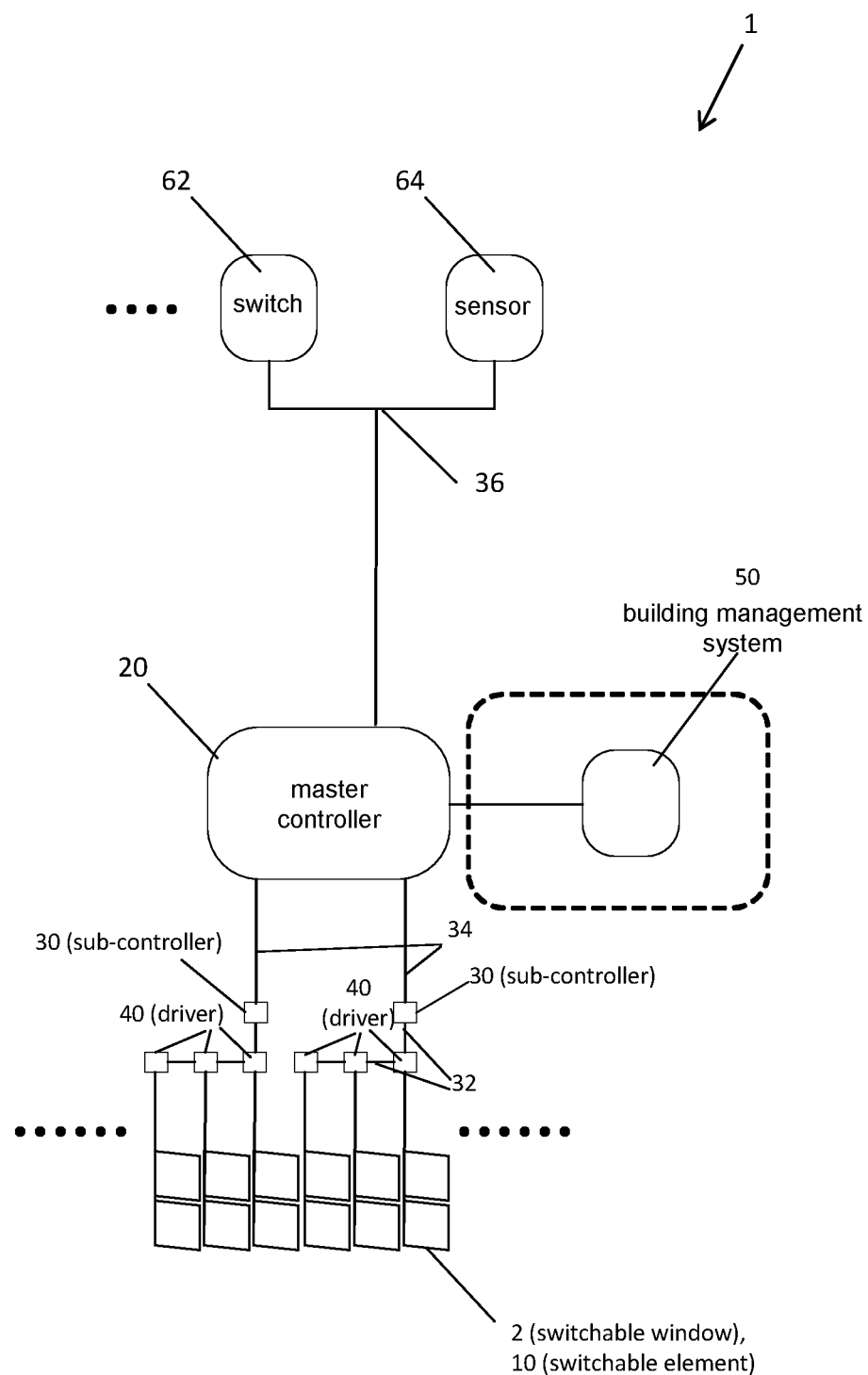
FIG. 1 shows a first embodiment of a system for controlling the state of two or more liquid crystal-based switchable elements.

FIG. 1 schematically shows a first embodiment of a system 1 for controlling the state of two or more liquid crystal-based switchable elements 10. The switchable elements 10 may, for example, be configured to control the transmission of solar radiation through smart windows 2 comprising the switchable elements 10.

In the example shown in FIG. 1, the system 1 controls twelve switchable elements 10 arranged in twelve smart windows 2. The liquid crystal-based switchable elements 10 may change their optical state from a transparent state to a dark state depending on an AC driving signal. The system 1 comprises drivers 40 for providing the driving signals to the switchable elements 10. Drivers 40 may include a processor (not shown), controllable electronic devices (not shown) such as transistors and other supporting electronic devices (not shown) to ensure that the output driving signals are appropriate (e.g. appropriate voltage/current) for controlling the states of switchable elements 10. In the configuration shown in FIG. 1, each of the drivers 40 is configured for generating the driving signals for two switchable elements 10. Accordingly, the system shown in FIG. 1 comprises six drivers 40.

For setting the states of the switchable elements 10 in a coordinated manner, the system 1 comprises a master controller 20 that includes a processor (not shown) and a memory device (not shown) among others. Upon loading and executing software code or instructions which are tangibly stored in the memory device, such as on a magnetic medium, e.g., a computer hard drive, an optical medium, e.g., an optical disc, solid-state memory, e.g., flash memory, or other storage media known in the art, master controller 20 performs various steps as outlined in this disclosure. The master controller 20 is configured to store at least two keyframes, wherein each keyframe comprises setting values defining the intended state of each switchable element 10 of a group of switchable elements 10 for a certain condition. The group may be a selection of one or more specific switchable elements 10 or all available switchable elements 10. For example, the group may comprise all twelve of the switchable optical elements 10 which may be arranged in a grid pattern having two rows and six columns.

The keyframes may, for example, define an animation of a horizontally moving curtain. A first keyframe may define the state of all switchable elements 10 to be fully transparent and a last keyframe may define the state of all switchable elements to have minimum transparency. A second keyframe could define only the first column to have minimum transparency and the other rows to have maximum transparency, wherein with each subsequent keyframe a further column is set to have minimum transparency. Further, each keyframe is assigned a timecode.

Further, the master controller 20 is configured to compute a display frame based on at least one of the defined keyframes. This display frame comprises setting values defining the optical state for each of the switchable elements 10 to be set using the driving signals generated by the drivers 40.

The master controller 20 comprises a connection to a control bus 36 for receiving sensor input and/or user input. The control bus 36 may, for example be configured as a KNX bus. In the example embodiment depicted in FIG. 1, the control bus 36 is connected to a switch 62 and a sensor 64. The switch 62 may, for example, be configured as a dimmer switch and the sensor 64 may, for example, be configured as an interior photo sensor for determining a light level in a room.

The master controller 20 may compute the display frame in dependence on user input provided by the switch 62 and sensor input provided by the sensor 64.

Based on the setting values defined by computed display frames, driving signals are generated for the switchable elements 10. In the embodiment depicted in FIG. 1, multiple drivers 40 are used, which are connected to the master controller 20 by means of a hierarchical network comprising sub-controllers 30 that each include a processor (not shown) and a memory device (not shown) among others. Upon loading and executing software code or instructions which are tangibly stored in the memory device, such as on a magnetic medium, e.g., a computer hard drive, an optical medium, e.g., an optical disc, solid-state memory, e.g., flash memory, or other storage media known in the art, sub-controllers 30 perform various steps as outlined in this disclosure. In the embodiment shown in FIG. 1, the master controller 20 communicates with the sub-controllers 30 using communication means 34, which may be an Ethernet local area network, and the sub-controllers 30 communicate with the multiple drivers 40 using a serial communication line 32, in particular a RS485 bus.

In an alternative embodiment, the functions of the sub-controllers 30 and the drivers 40 connected to the respective sub-controller 30 may be integrated into a single device. In other words, the drivers 40 would be equipped with an interface for the communication means 34 and can then directly connect to the master controller 20. In such a case, a second protocol such as the serial communication line 32 could be used for device internal communication inside the combined sub-controller/driver device.

A user may easily set a desired state of the twelve switchable elements 10 by using the dimmer switch. Depending on the position of the dimmer switch, a certain point in time of the animation of the horizontally moving curtain is set as setpoint. The master controller 20 plays the defined animation by subsequently computing appropriate display frames, until the certain point in time of the animation defined by the setpoint is reached.

Additionally or alternatively, the desired state of the twelve switchable elements 10 may be set in dependence on sensor input provided by the sensor 64. For example, initially the twelve switchable elements are in a state defined by the first frame of the animation and are thus in the state of maximum transparency. If a light level in the room rises above a predetermined threshold, the timecode of the animation representing the last frame may be selected as setpoint. The system will then produce an aesthetically pleasing transition of the twelve switchable elements 10 from the state of maximum transparency to the state of minimum transparency as defined by the respective keyframe of the animation.

In one embodiment, the system 1 as described with respect to FIG. 1 further comprises a building management system 50 which is connected to the master controller 20 and serves as a further data source for computing the display frames. For example, the building management system 50 (e.g. personal computer, smart device such as a smartphone or tablet, control panel, etc.) could be configured via a software application controlled by the building manager to provide a time dependent signal to the master controller 20 causing the master controller 20 to select a certain point in time of the animation as setpoint. For example, the system 1 comprising the building management system 50 could be configured to set the switchable elements 10 to a state of minimum transparency for a timespan in which a room comprising the smart windows 2 having the switchable elements 10 is exposed to direct sunshine and to set a state of maximum transparency otherwise. In each case, the system 1 will provide an aesthetically pleasing transition between the respective states by playing the animation sequence as defined by the keyframes.

Figure 2:
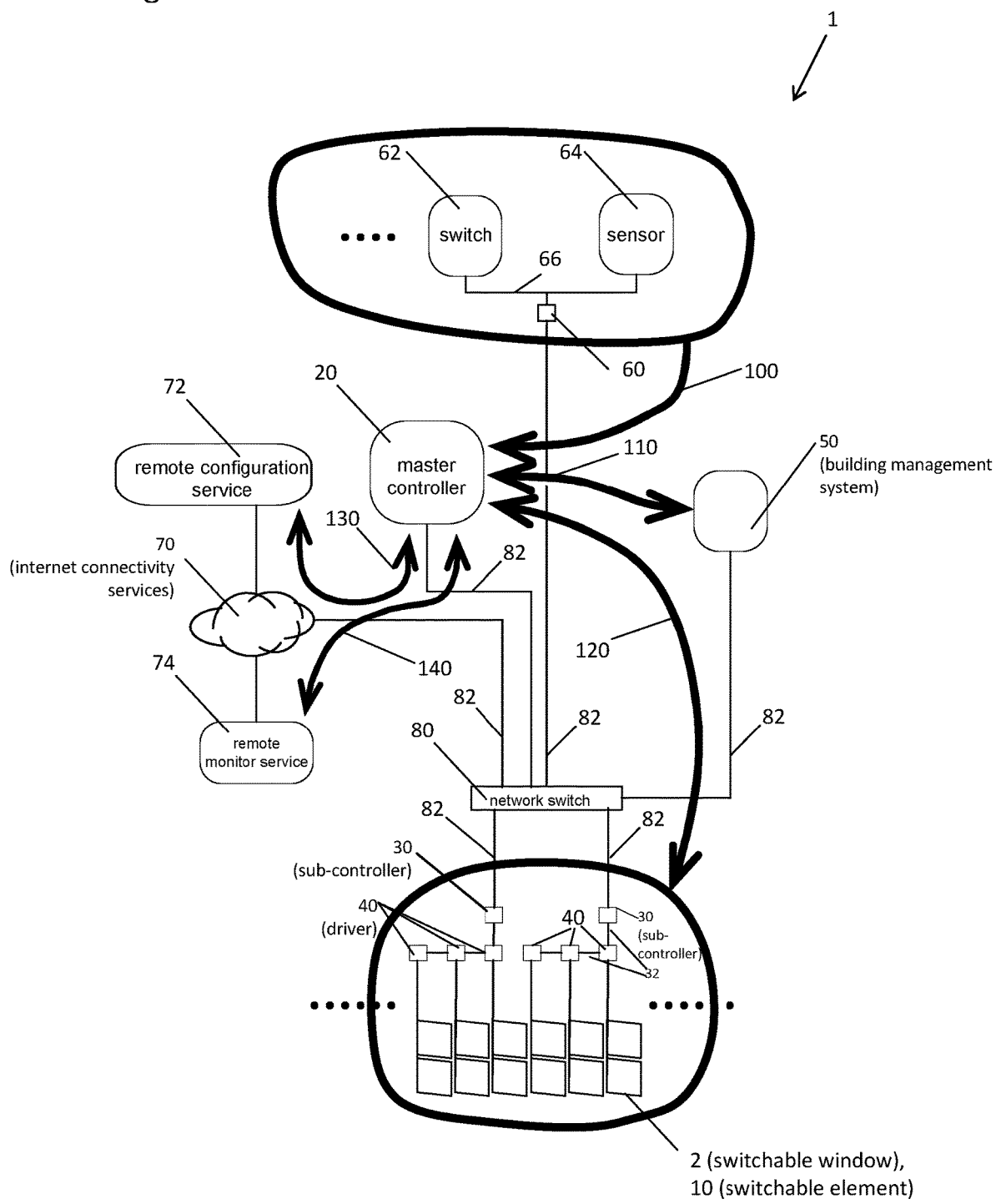
FIG. 2 shows a second embodiment of the system for controlling the state of two or more liquid crystal-based switchable elements.

FIG. 2 shows a schematic view of a second embodiment of the system 1 for controlling the state of two or more liquid crystal-based switchable elements 10.

Similar to the system 1 of the first embodiment, the system 1 comprises in the example of FIG. 2 twelve switchable elements 10 arranged in twelve smart windows 2. The liquid crystal-based switchable elements 10 may change their optical state from a transparent state to a dark state depending on an AC driving signal provided by drivers 40. In the embodiment shown in FIG. 2, each of the drivers 40 provides the AC driving signals to the electrodes of two of the switchable elements 10. Accordingly, the system shown in FIG. 2 comprises six drivers 40. The six drivers 40 are connected to sub-controllers 30. The sub-controllers 30 provide signals to the drivers 40 which instruct the drivers 40 to generate the respective driving signals. The sub-controllers 30 may communicate with the drivers 40 by means of a bus, such as a RS485 bus.

The system 1 comprises a master controller 20 which, as described with respect to FIG. 1, is configured to store at least two keyframes, wherein each keyframe comprises setting values defining the intended state of each switchable element 10 of a group of switchable elements 10. The group may be a selection of one or more specific switchable elements 10 or all available switchable elements 10. The master controller 20 is further configured to compute a display frame comprising setting values which define the state to be set of the switchable elements 10. The display frame is computed in dependence on input signals which may be provided in the form of user input, sensor signals and/or rules.

For providing sensor input and user input, the system as shown in FIG. 2 comprises a control bus interface 60 connected to an input control bus 66, for example configured as KNX bus, for connecting switches 62 and sensors 64. For processing of rules, the system may comprise a building management system 50.

In contrast to the configuration of the system 1 of FIG. 1, the master controller 20, the bus interface 60, the building management system 50 and the sub-controllers 30 are interconnected by means of network connections 82 in a star topology using a network switch 80. The network connections 82 may, for example, be configured as Ethernet links allowing for communication between the devices on the input control bus 66 and the master controller 20, marked with an arrow having the reference numeral 100. Further, the system 1 allows for communication between the master controller 20 and the building management system 50, marked with an arrow having the reference numeral 110, as well as for communication between the master controller 20 and the sub-controllers 30 marked with an arrow having the reference numeral 120. Thus, the system 1 of FIG. 2 has a different network topology, but may operate essentially in the same manner as described with respect to the embodiment of FIG. 1.

The system 1 as depicted in FIG. 2 further comprises internet connectivity which is depicted as a network connection 82 to an internet connectivity service 70. The internet connectivity service 70 may, for example, comprise a remote configuration service 72 implemented as one of more devices (e.g. server, personal computer, smart device, etc.) and a remote monitor service 74 implemented as one of more devices (e.g. server, personal computer, smart device, etc.).

The remote configuration service 72 may communicate with the master controller 20 as indicated with the arrow having the reference numeral 130 and may in particular allow a service agent to configure the master controller 20. For example, the initial setup of the master controller 20 which comprises the definition of the animations and their keyframes may be performed by a service agent via the remote configuration service 72.

The remote monitor service 74 may communicate with the master controller 20 as indicated with the arrow having the reference numeral 140. The master controller 20 may be configured to transmit the current status of the system 1 as well as possible error messages to the remote monitoring service 74. If abnormal operation or an error is communicated to the remote monitor service 74, a service agent may make use of the remote configuration service 72 for making changes to the configuration of the system 1 or may dispatch a service team for providing maintenance if required.

Although FIG. 2 depicts a network having network connections 82 in star topology, not all possible interactions of the connected devices are used. Since the master controller 20 maintains the animations (represented by the at least two reference frames), this is the only device that communicates to the drivers 40 (via the sub-controllers 30). All other devices, in particular the building management system 50, the switch 62 and the sensor 64 only interact with the master controller 20. This way, the master controller 20 is the central point of control. In further embodiments, other network topologies such as chains or rings may also be used. For example, if the network covers multiple floors of a building, each floor may be provided with a network switch 80, wherein the network switches 80 of each floor are interconnected.

Figure 3:
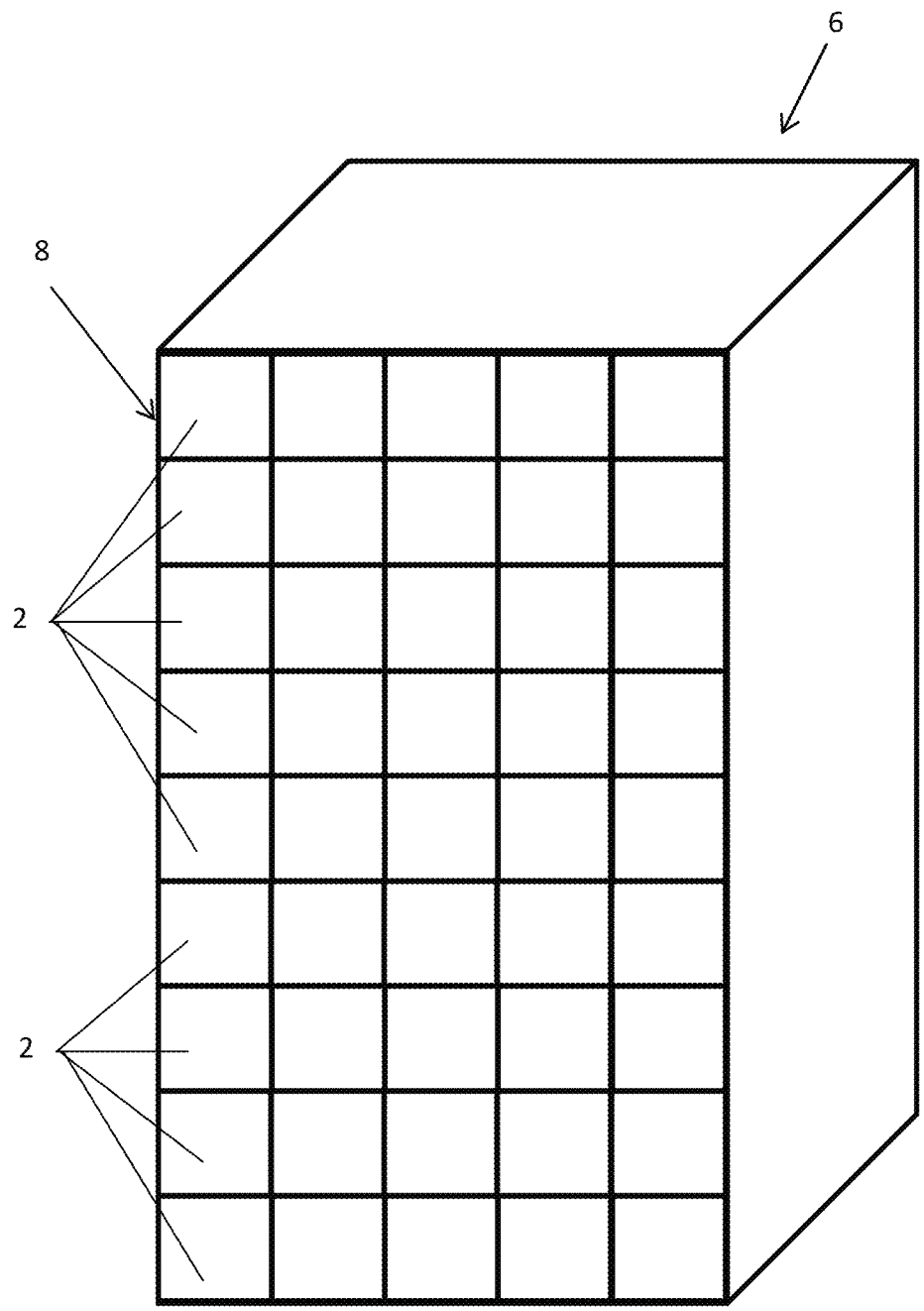
FIG. 3 shows a façade of a building.

FIG. 3 schematically depicts a façade 8 of a building 6 having multiple smart windows 2 arranged in a grid pattern. The system 1 as described with respect to FIGS. 1 and 2 may be used to control the state of all smart windows 2 of the building 6 or at least all smart windows 2 of the façade of the building 6. This allows in particular for a coordinated and synchronized operation of all smart windows 2 and may be used to provide aesthetically pleasing transitions between two states of the smart windows 2.

FIGS. 4a to 4d depict four different keyframes of an animation of a vertically moving curtain which may be used to control the light level in a room. In the example depicted in FIGS. 4a to 4d, the room has a wall 7 having 25 switchable elements 10 which are configured as individual smart windows 2. The smart windows 2 of the wall 7 are arranged in a 5 by 5 matrix. However, it would also be conceivable to use the four keyframes to define the state of a single smart window 2 comprising 25 switchable elements 10 configured as switchable subunits which are arranged in a 5 by 5 matrix. Each of the switchable elements 10 may be switched independently.

Figure 4A:
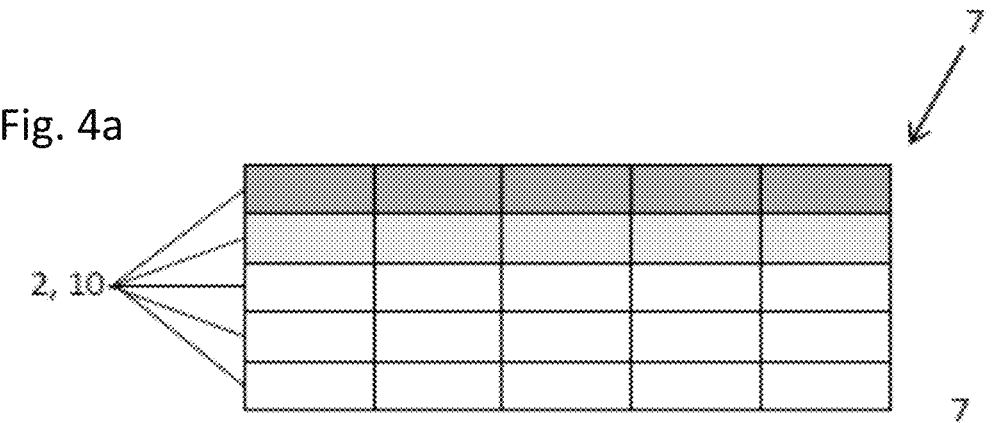
FIGS. 4a to 4d show an animation of a vertically moving curtain.

In a first keyframe depicted in FIG. 4a which has an assigned timecode of "0", a first row of switchable elements 10 is assigned a transparency of 60% and a second row of switchable elements 10 is assigned a transparency of 80%. The remaining three rows are each assigned a transparency of 100% as setting value.

Figure 4B:
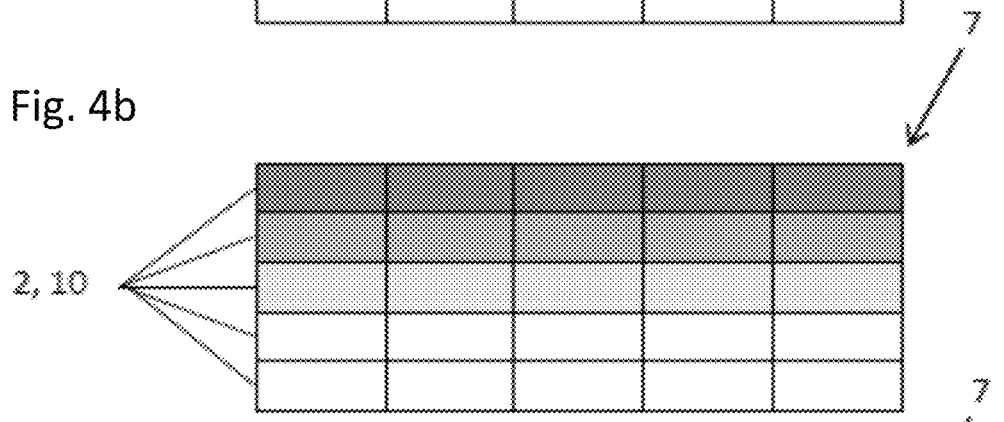

In a second keyframe depicted in FIG. 4b which has an assigned timecode of "33", the first row of switchable elements 10 is assigned a transparency of 40% and the second row of switchable elements 10 is assigned a transparency of 60%. A third row has an assigned transparency of 80%. The remaining two rows are each assigned a transparency of 100% as setting value.

Figure 4C:
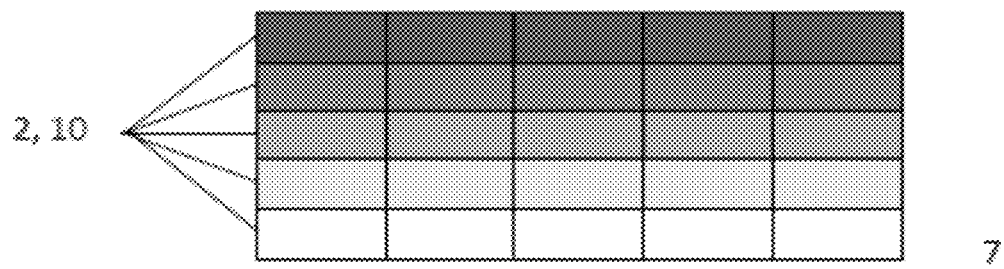

In a third keyframe depicted in FIG. 4c which has an assigned timecode of "67", the first row of switchable elements 10 is assigned a transparency of 20% and the second row of switchable elements 10 is assigned a transparency of 40%. The third row has an assigned transparency of 60% and a fourth row as an assigned transparency of 80%. The last row has an assigned transparency of 100% as setting value.

Figure 4D:
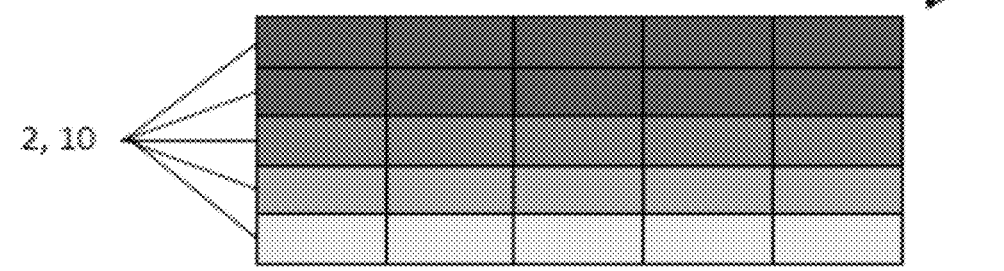

In a fourth and last keyframe depicted in FIG. 4d which has an assigned timecode of "100", the first two rows of switchable elements 10 have an assigned transparency of 20% and the third row of switchable elements 10 has an assigned transparency of 40%. The fourth row has an assigned transparency of 60%. The last row has an assigned transparency of 80% as setting value.

When the animation is played from the first keyframe of FIG. 4a to the last keyframe of FIG. 4d, the wall 7 comprising the switchable elements 10 darkens from top to bottom simulating a vertically closing curtain.

A user may, for example, select any intermediate state by selecting a certain point in time between the timecodes 0 and 100 as setpoint. This selection may, for example, be performed by using a dimmer switch wherein a certain position of the switch is assigned to a certain timecode. Alternatively, a step size of, for example, 10 may be defined and the certain point in time may be selected by issuing step up/step down commands incrementing/decrementing the certain point in time in steps defined by the step size.

Figure 5A:
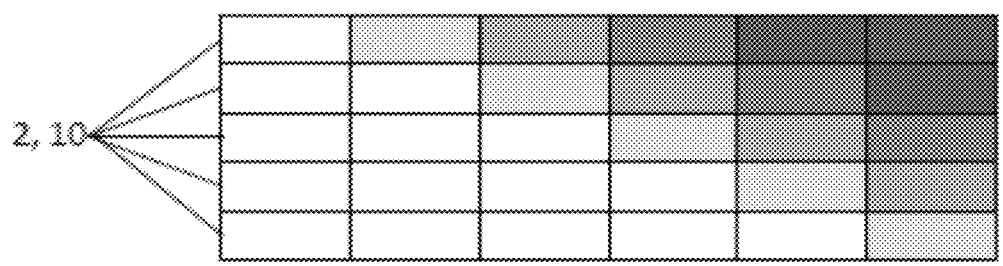
FIGS. 5a to 5c show an animation of a moving diagonal curtain.
Figure 5B:
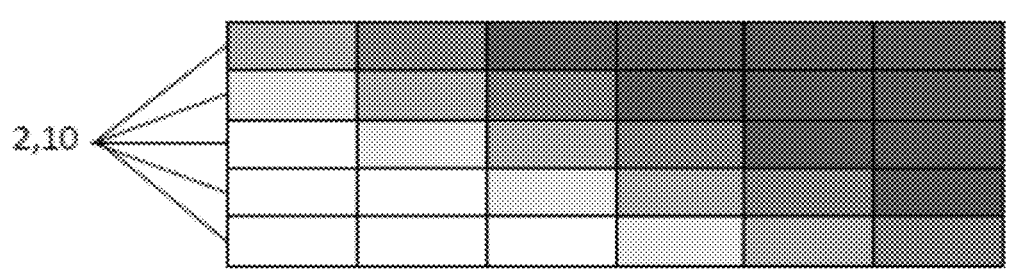
Figure 5C:
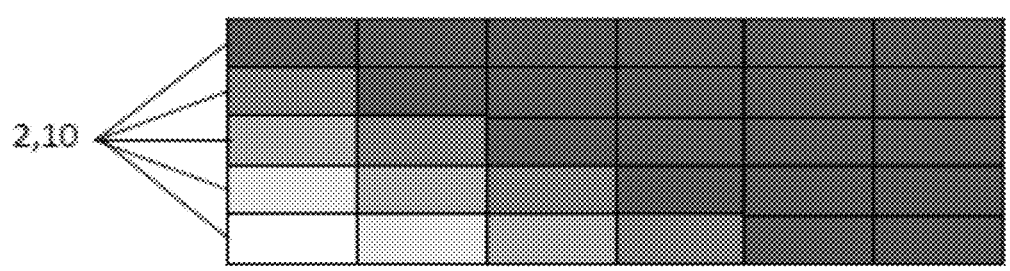

FIGS. 5a to 5c depict three different keyframes of an animation of a moving diagonal curtain as a further example for an animation. In the example of FIGS. 5a to 5c, a wall 7 has 30 switchable elements 10 configured as smart windows 2 which are arranged in a 6 by 5 matrix. However, it would also be possible to use the same keyframes to define the state of a single smart window 2 having 30 switchable subunits as switchable elements 10 which are arranged in a 6 by 5 matrix. In the depicted keyframes, a gradient is shown wherein the switchable element 10 on the lower left is always set to maximum transparency and the switchable element 10 on the upper right is always set to minimum transparency. The point of 50% transparency is moved further towards the left by in each row shifting the transparency values for each of the switchable elements 10 towards the left side for each consecutive keyframe. When the animation is played from the first keyframe of FIG. 5a to the last keyframe of FIG. 5c, this creates the illusion of a diagonal curtain moving from right to left.

LIST OF REFERENCE NUMERALS

1 system
2 switchable window
6 building
7 wall
8 façade
10 switchable element
20 master controller
30 sub-controller
32 serial communication line
34 communication means
36 control bus
40 driver
50 building management system
60 control bus interface
62 switch
64 sensor
66 input control bus
70 internet connectivity services
72 remote configuration service
74 remote monitor service
80 network switch
82 network connection
100 communication from user input and/or sensor input
110 communication with building management system
120 communication with switchable elements
130 communication with remote configuration
140 communication with remote monitoring

The invention claimed is:

1. A method performed by a master controller for controlling the state of two or more liquid crystal-based switchable elements, the liquid crystal-based switchable elements being configured as smart windows and/or switchable subunits of smart windows, the method comprising:
   a) defining, by a processor of the master controller, at least two keyframes, each keyframe comprising setting values defining the intended state of a group of liquid crystal-based switchable elements, the group being either a selection of one or more specific liquid crystal-based switchable elements or all available liquid crystal-based switchable elements;
   b) computing, by the processor of the master controller, a display frame comprising setting values for the state of the group of liquid crystal-based switchable elements, based on at least one of the defined keyframes; and
   c) controlling, by the processor of the master controller, the state of each of the liquid crystal-based switchable elements of the group of liquid crystal-based switchable elements as defined by the setting values of the computed display frame,
wherein controlling the state according to step c) comprises, for each of the liquid crystal-based switchable elements of the group of liquid crystal-based switchable elements, the steps of:

d) deriving, by the processor of the master controller, of an AC driving signal for the respective switchable element based on the respective setting value defined by the display frame and configuration values defining the relation between driving signal and a setting value of the respective switchable element; and e) applying, by the processor of the master controller, the derived AC driving signal to the respective switchable element, wherein at least two keyframes are assigned to an animation and each keyframe is assigned a time code, and wherein an animation defined by the assigned keyframes is played back in accordance with the assigned time codes from a current time to a specific point in time by computing a display frame by means of a filter function in dependence on at least one of the keyframes of the animation and the current time, and wherein steps b) and c) are repeated until playback of the animation is complete and the current time is advanced in accordance with a predefined playback frame rate after each execution of step b).

2. The method according to claim 1, wherein the specific point in time of the animation is selected as a setpoint in response to user input, sensor input or a predetermined rule and the animation is played back from the current time to the setpoint.

3. The method according to claim 2, wherein a step size is assigned to the animation, wherein the step size is given in respect to the time codes assigned to the keyframes assigned to said animation, and the specific point in time of the animation is set as setpoint by receiving step up or step down commands as user input, sensor input or in response to predefined rules.

4. A method performed by a master controller for controlling the state of two or more liquid crystal-based switchable elements, the liquid crystal-based switchable elements being configured as smart windows and/or switchable subunits of smart windows, the method comprising:

a) defining, by a processor of the master controller, at least two keyframes, each keyframe comprising setting values defining the intended state of a group of liquid crystal-based switchable elements, the group being either a selection of one or more specific liquid crystal-based switchable elements or all available liquid crystal-based switchable elements;

b) computing, by the processor of the master controller, a display frame comprising setting values for the state of the group of liquid crystal-based switchable elements, based on at least one of the defined keyframes; and c) controlling, by the processor of the master controller, the state of each of the liquid crystal-based switchable elements of the group of liquid crystal-based switchable elements as defined by the setting values of the computed display frame, wherein at least two keyframes are assigned to an animation, wherein each keyframe is assigned a time code, wherein an animation defined by the assigned keyframes is played back in accordance with the assigned time codes from a current time to a specific point in time by computing a display frame by means of a filter function in dependence on at least one of the keyframes of the animation and the current time, and wherein steps b) and c) are repeated until playback of the animation is complete and the current time is advanced in accordance with a predefined playback frame rate after each execution of step b).

5. The method according to claim 4, wherein a communication network is arranged between the master controller that is at least configured to compute the display frame according to step b) and a driver for driving a switchable element, wherein the communication network comprises at least one sub-controller.

6. The method according to claim 5, wherein the sub-controller is configured for storing current setting values of liquid crystal-based switchable elements assigned to the at least one sub-controller.

7. The method according to claim 6, wherein the at least one sub-controller is further configured to store pending updates of the setting values of the liquid crystal-based switchable elements assigned to the at least one sub-controller and to update the current setting values in a coordinated manner in response to a trigger signal or trigger command received from the master controller.

8. The method according to claim 7, wherein a clock of the at least one sub-controller and the master controller are synchronized and the update of the current setting values is executed by the at least one sub-controller at a predetermined time after being triggered by the master controller.

9. The method according to claim 5, wherein the at least one sub-controller is configured to communicate with the master controller using a first protocol and is configured to communicate with the at least one driver using a second protocol.

10. The method according to claim 4, wherein configuration data assigned to a switchable element comprises address information for identifying a driver for driving the respective switchable element and the address information is used to transmit the setting value or the derived driving signal to the identified driver.

11. The method according to claim 4, wherein computing of a display frame in accordance with step b) is performed by selection of one of the defined keyframes as a setpoint in response to user input, sensor input and/or in dependence on predefined rules.

12. The method according to claim 4, wherein the state of a switchable element defines a tint and/or a haze level of the respective switchable element.

13. The method according to claim 4, wherein the animation is configured as an animation of a horizontally or vertically closing curtain.

14. The method according to claim 4, wherein computing of the display frame according to step b) further comprises adaptation of setting values defined by a keyframe by applying a function in response to user input, sensor input or a predetermined rule.

15. A master controller for controlling the state of two or more liquid crystal-based switchable elements for use in a method for controlling the state of two or more liquid crystal-based switchable elements, the liquid crystal-based switchable elements being configured as smart windows and/or switchable subunits of smart windows, the method comprising:

a) defining, by a processor of the master controller, at least two keyframes, each keyframe comprising setting values defining the intended state of a group of liquid crystal-based switchable elements, the group being either a selection of one or more specific liquid crystal-based switchable elements or all available liquid crystal-based switchable elements;

b) computing, by the processor of the master controller, a display frame comprising setting values for the state of the group of liquid crystal-based switchable elements, based on at least one of the defined keyframes; and c) controlling, by the processor of the master controller, the state of each of the liquid crystal-based switchable elements of the group of liquid crystal-based switchable elements as defined by the setting values of the computed display frame, wherein the processor of the master controller is configured to store keyframes defined in accordance with step a) of the method and to compute a display frame in accordance with step b) of the method, wherein at least two keyframes are assigned to an animation, wherein each keyframe is assigned a time code, wherein an animation defined by the assigned keyframes is played back in accordance with the assigned time codes from a current time to a specific point in time by computing a display frame by means of a filter function in dependence on at least one of the keyframes of the animation and the current time, and wherein steps b) and c) are repeated until playback of the animation is complete and the current time is advanced in accordance with a predefined playback frame rate after each execution of step b).

* * * * *

UNITED STATES PATENT AND TRADEMARK OFFICE
CERTIFICATE OF CORRECTION

| | | |
|---|---|---|
| PATENT NO. | : 12,031,378 B2 | Page 1 of 1 |
| APPLICATION NO. | : 17/511984 | |
| DATED | : July 9, 2024 | |
| INVENTOR(S) | : Ties de Jong et al. | |

It is certified that error appears in the above-identified patent and that said Letters Patent is hereby corrected as shown below:

On the Title Page

Please insert -- (30) Foreign Application Priority Data
Oct. 28, 2020 (EP) ....... 20204274 --.

Signed and Sealed this
Twenty-ninth Day of April, 2025

Coke Morgan Stewart
*Acting Director of the United States Patent and Trademark Office*